United States Patent
Mo et al.

(10) Patent No.: US 10,680,999 B2
(45) Date of Patent: Jun. 9, 2020

(54) 302 JUMPING METHOD, URL GENERATING METHOD AND SYSTEM, AND DOMAIN-NAME RESOLVING METHOD AND SYSTEM

(71) Applicant: WANGSU SCIENCE & TECHNOLOGY CO., LTD., Shanghai (CN)

(72) Inventors: Xiaoqi Mo, Shanghai (CN); Jihong Lin, Shangha (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 400 days.

(21) Appl. No.: 15/529,164

(22) PCT Filed: Nov. 25, 2016

(86) PCT No.: PCT/CN2016/107198
§ 371 (c)(1),
(2) Date: May 24, 2017

(87) PCT Pub. No.: WO2018/049730
PCT Pub. Date: Mar. 22, 2018

(65) Prior Publication Data
US 2018/0331997 A1    Nov. 15, 2018

(30) Foreign Application Priority Data

Sep. 19, 2016   (CN) .......................... 2016 1 0831336

(51) Int. Cl.
*G06F 15/16* (2006.01)
*H04L 29/12* (2006.01)
*H04L 29/08* (2006.01)

(52) U.S. Cl.
CPC ........ *H04L 61/103* (2013.01); *H04L 61/1511* (2013.01); *H04L 61/305* (2013.01); *H04L 67/2814* (2013.01); *H04L 61/6004* (2013.01)

(58) Field of Classification Search
CPC . H04L 61/103; H04L 61/1511; H04L 61/305; H04L 61/6004; H04L 67/2814
See application file for complete search history.

(56) References Cited

U.S. PATENT DOCUMENTS

2002/0035611 A1*   3/2002  Dooley ............. H04L 29/12009
                                                                709/218
2006/0020684 A1*   1/2006  Mukherjee .............. H04L 67/06
                                                                709/219

(Continued)

FOREIGN PATENT DOCUMENTS

| CN | 102668518 A | 9/2012 |
| CN | 104427499 A | 3/2015 |
| WO | 2016127914 A1 | 8/2016 |

OTHER PUBLICATIONS

The World Intelectual Property Office (WIPO) International Search Report for PCT/CN2016/107198 dated Jun. 8, 2017 5 pages.

(Continued)

*Primary Examiner* — Richard G Keehn
(74) *Attorney, Agent, or Firm* — Anova Law Group, PLLC

(57) ABSTRACT

The present disclosure provides a jumping URL generating method, a jumping URL system, and a jumping server; a resolving method and a system for resolving a domain-name resolution request, and a DNS server; and a 302 jumping method and a network system that support HTTPS. A client terminal sends a first HTTP request. The jumping server specifies a content server, convert an IP address of the content server to a prefix of a jumping domain name, uses a service domain name as a suffix of the jumping domain (Continued)

name, combines the jumping domain name and a URL in the first HTTP to form the jumping URL, and sends the jumping URL to the client terminal. The client terminal requests for resolving of the jumping domain name. The DNS server recognizes a domain name in the domain-name resolution request and performs an inverse converting on the prefix of the jumping domain name to obtain an IP address of the content server and sends the IP address of the content server to the client terminal. The client terminal sends a second HTTP request containing the jumping URL to the content server; and sends an IP generated by resolving and in correspondence of the first HTTP request to the client terminal.

13 Claims, 3 Drawing Sheets

(56) References Cited

U.S. PATENT DOCUMENTS

| 2007/0250560 | A1* | 10/2007 | Wein | H04L 67/1008 |
| | | | | 709/201 |
| 2010/0042681 | A1* | 2/2010 | Jeon | H04L 61/1511 |
| | | | | 709/203 |
| 2011/0026435 | A1* | 2/2011 | Weniger | H04W 8/065 |
| | | | | 370/254 |
| 2012/0290724 | A1 | 11/2012 | Raffaele et al. | |
| 2013/0301651 | A1* | 11/2013 | Haddad | H04L 69/16 |
| | | | | 370/467 |
| 2015/0222604 | A1* | 8/2015 | Ylonen | H04L 63/062 |
| | | | | 713/171 |
| 2016/0182441 | A1* | 6/2016 | Gupta | H04L 61/3025 |
| | | | | 709/245 |
| 2016/0316006 | A1* | 10/2016 | Zhang | H04L 61/1511 |
| 2016/0373445 | A1* | 12/2016 | Hayton | H04L 63/0815 |
| 2017/0289107 | A1* | 10/2017 | Plichta | H04L 63/102 |
| 2018/0107503 | A1* | 4/2018 | Machida | G06F 9/50 |
| 2018/0337830 | A1* | 11/2018 | Padhye | H04L 41/145 |

OTHER PUBLICATIONS

The European Patent Office (EPO) The extended European search Report for 16884246.6 dated Feb. 19, 2018 7 pages.

* cited by examiner

302 JUMPING METHOD, URL GENERATING METHOD AND SYSTEM, AND DOMAIN-NAME RESOLVING METHOD AND SYSTEM

CROSS-REFERENCES TO RELATED APPLICATIONS

This patent application is a national phase entry under 35 U.S.C § 371 of PCT Application No. PCT/CN2016/107198 filed on Nov. 25, 2016, which claims priority of Chinese patent application No. 201610831336.1, filed on Sep. 19, 2016, the entire content of all of which is incorporated herein by reference.

FIELD OF THE DISCLOSURE

The present disclosure relates to a 302 redirecting field and, particularly, to a URL (uniform resource locator) generating method and system, a domain-name resolving method and system, a 302 jumping method and a network system that support HTTPS (hypertext transfer protocol secure).

BACKGROUND

In CDN (content delivery network) systems, HTTP (hypertext transfer protocol) 302 jumping method is widely used. One scenario is that, when a server being accessed does not store the desired file, the server can redirect the access directly to the server that stores the file based on known data. Another scenario is that, there exists a 302 jumping method of which the streaming media load balancing system is HTTP protocol (HTTP Load Balance, referred to as: HLB). This kind at load balancing system based on HTTP directing has many outstanding advantages compared to domain name system (DNS)-based traffic load system, such as being highly real-time and accurate, and having content perception.

The HTTPS protocol is a secure extension of the HTTP protocol, providing server authentication and protecting the privacy and integrity of data. Based on security considerations, more and more websites began to use HTTPS protocol to show their content. However, HTTPS protocol does not intrinsically support a 302 jumping method, in HTTP protocol, that uses an Internet protocol (IP) as the destination. Because, after the 302 jumping, the carried IP would be used as a host, causing the client terminal in the secure socket layer (SSL) handshake stage to take the IP as a domain name to verify the legitimacy of the certificate, rather than using the domain name (provided by the certificate on the server) before the jumping for verification. This will lead to certificate verification failure.

One of the existing ways to support HTTPS jumping is to add the name or ID (identification) of the server, which is to be jumped to, into the domain name. For example, when the client terminal is expected to access the server having the ID of xyz, a 302 jumping URL to the domain name of xyz.chinanetcenter.com may be returned. When the client terminal resolves xyz.chinanetcenter.com, the server obtains the IP address of xyz based on internal storage and returns it to the client terminal. However, this method still has shortcomings. That is, the jumping method is not easy to expand. When servers change, the DNS server must timely update the IP list of the servers, otherwise the domain-name resolution requests may not be resolved or the resolving may be wrong.

In general, when a CDN client needs to use HTTPS for an entire website, the 302 jumping technology, using an IP as the destination, cannot directly support the action of the CND client.

BRIEF SUMMARY OF THE DISCLOSURE

In view of the shortcomings of the conventional technology, the goal of the present disclosure includes using the disclosed generating method and system for jumping URL, the resolving method and system for domain-name resolution request, and the 302 jumping method and the network system support HTTPS to solve the aforementioned problems in the conventional technology.

To realize the aforementioned goal and other relevant goals, the present disclosure provides a jumping URL (uniform resource locator) generating method, applied on a jumping server connected to a client terminal through a communication link, including; receiving a first HTTP (hypertext transfer protocol) request sent from the client terminal; and specifying a content server, converting an IP (Internet protocol) address of the content server to a prefix of a jumping domain name according to predetermined rules, using a pre-registered domain name as a suffix of the jumping domain name, combining the jumping domain name and a URL in the first HTTP to form the jumping URL, and sending the jumping URL to the client terminal.

In one embodiment, the predetermined rules include a Base32 algorithm.

In one embodiment, the prefix of the jumping domain name further includes content converted from a domain name in the first HTTP request according to the predetermined rules.

To realize the aforementioned goal and other relevant goals, the present disclosure provides a resolving method for resolving a domain-name resolution request, applied on a DNS (domain name system) server connected to a client terminal through a communication link, for resolving the jumping domain name, including: receiving a domain-name resolution request, for resolving the jumping domain name, sent from the client terminal; and in response to recognizing the pre-registered domain name in the domain-name resolution request, converting the prefix of the jumping domain name based on an inverse operation of the predetermined rules to obtain an IP address of the content server, and sending the IP address of the content server to the client terminal.

In one embodiment, the predetermined rules include a Base 32 algorithm.

In one embodiment, converting the prefix of the jumping domain name based on an inverse operation of the predetermined rules further includes obtaining a domain name in the first HTTP request.

To realize the aforementioned goal and other relevant goals, the present disclosure provides a 302 jumping method that supports HTTPS (hypertext transfer protocol secure), applied on a network formed by a jumping server, a DNS (domain name system) server and a content server which are respectively connected to a client terminal through a communication link, the method including: sending, by the client terminal, a first HTTP (hypertext transfer protocol) request to the jumping server; receiving, by the jumping server, the first HTTP request; specifying, by the jumping server, a content server, to convert an IP address of the content server to a prefix of a jumping domain name according to predetermined rules; using, by the jumping server, a pre-registered domain name as a suffix of the jumping domain name;

combining, by the jumping server, the jumping domain name and a URL (uniform resource locator) in the first HTTP to form the jumping URL; and sending, by the jumping server, the jumping URL to the client terminal; receiving, by the client terminal, the jumping URL, and sending, by the client terminal, a domain-name resolution request for resolving the jumping domain name in the jumping URL to the DNS server; receiving, by the DNS server, the domain-name resolution request; in response to recognizing the pre-registered domain name in the domain-name resolution request, inverse converting, by the DNS server, the prefix of the jumping domain name based on the predetermined rules to obtain an IP address of the content server; and sending, by the DNS server, the IP address of the content server to the client terminal; receiving, by the client terminal, the IP address of the content server, and sending, by the client terminal, a second HTTP request containing the directing URL, to the content server; and receiving, by the content server, the second HTTP request, and sending, by the content server, an HTTP response, generated accordingly, to the client terminal.

To realize the aforementioned goal and other relevant goals, the present disclosure provides a URL (uniform resource locator) generating system, applied on a jumping server connected to a client terminal through a communication link, including: a request receiving module, for receiving a first HTTP request sent from the client terminal; and a URL generating module, for specifying a content server, converting an IP address of the content server to a prefix of a jumping domain name according to predetermined rules, using a pre-registered domain name as a suffix of the jumping domain name, combining the jumping domain name and a URL in the first HTTP request to form the jumping URL, and sending the jumping URL to the client terminal.

To realize the aforementioned goal and other relevant goals, the present disclosure provides a domain-name resolving system for resolving, a domain-name resolution request, applied on a DNS server connected to a client terminal through a communication link, for resolving any one of the aforementioned jumping domain name, including: a request receiving module, for receiving a domain-name resolution request for resolving the jumping domain name sent from the client terminal; and a request resolving module, in response to recognizing the pre-registered domain name in the domain-name resolution request, converting a prefix of the jumping domain name based on an inverse operation of the predetermined rules to obtain an IP address of the content server, and sending the IP address of the content server to the client terminal.

To realize the aforementioned goal and other relevant goals, the present disclosure provides a network system, including: a jumping server, a DNS server, and a content server, respectively connected to a client terminal through communication link, wherein the jumping server includes the aforementioned URL generating method, and the DNS server includes the aforementioned domain-name resolving system for domain name resolution request.

Thus, the disclosed 302 jumping method, the URL generating method and system, and domain-name resolving method and system, solve the issue of 302 jumping technology cannot be directly used in an existing CDN system when the entire website uses HTTPS, and scalability can be effectively increased.

DETAILED DESCRIPTION

Figure 1:
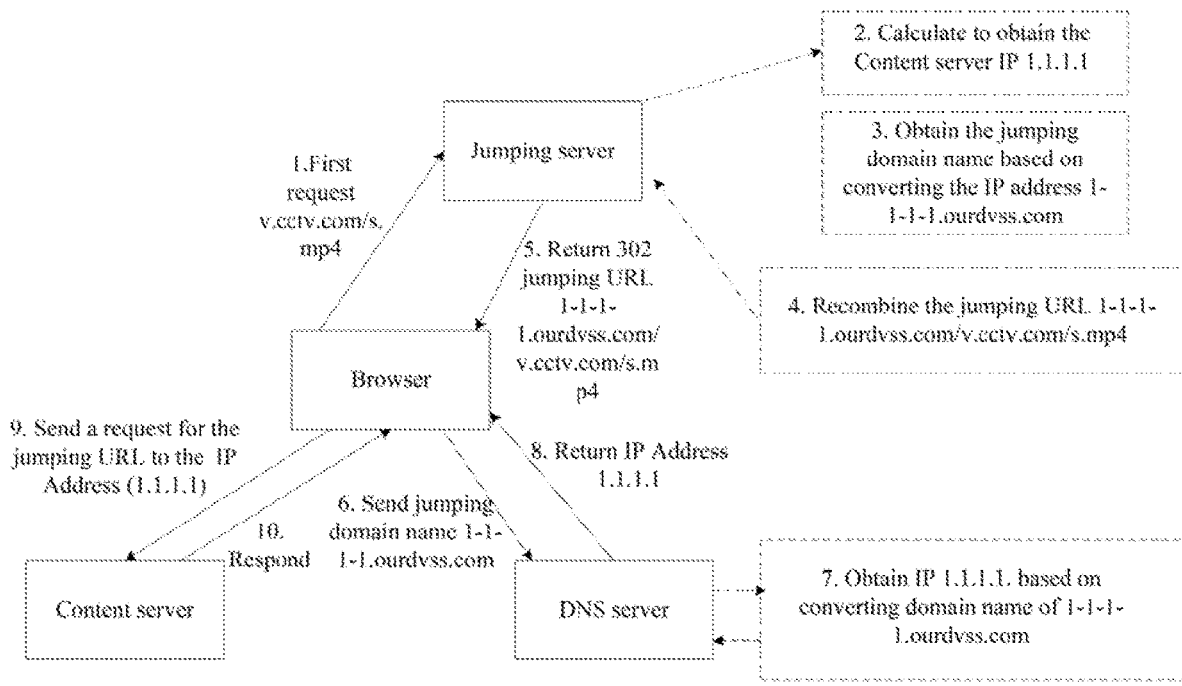
FIG. 1 illustrates an exemplary of 302 jumping method consistent with the disclosed embodiments of the present disclosure.

Various advantages and effects of the present disclosure will be readily apparent to those skilled in the art from the disclosure of the specification by way of specific embodiments thereof. The present disclosure may also be further embodied or applied with different embodiment, and the details in this specification may be modified or varied without departing from the spirit of the disclosure, on the basis of different views and applications. It is to be noted that, without conflict, the features of the following embodiments and examples may be combined with one another.

It should be noted that the illustrations provided in the following embodiments illustrate only the basic concept of the present disclosure in a schematic manner, and only the components related to the present disclosure are shown in the drawings, rather than the number, shape and size of the actual implementations of the components. In practice, the shape, quantity, and proportions of each component can be flexibly changed, and arrangement and status of the components may also be more complex.

In view of the features of the current HTTPS, the present disclosure provides a jumping method which is based on a special domain name generated from the IP to replace the IP. The main problem solved by the present disclosure includes (1) HTTPS not intrinsically supporting 302 jumping that uses an IP as the destination; (2) poor scalability of many technologies in the conventional CDN systems that relying on the HTTP 302 jumping, and of many technologies that directly use an IP as the destination.

As shown in FIG. 1, the present disclosure provides a network system, include a jumping server, a DNS server, and a content server. Each described server is connected with the client terminal through communication link. It should be noted that, the specifying method of the three servers are not the key point discussed in the present disclosure, those skilled in the art may specify a server according to an existing technology, for example, may be specified according to the principles such as a closest service distance principle, or service network operator, which are not repeated herein.

On this basis, the present disclosure provides a 302 jumping method that supports HTTPS. The disclosed method can be applied in the network system shown in FIG. 1. The implementation of the disclosed method is now illustrated in view of the specific embodiments shown in FIG. 1.

1. The client terminal, e.g., a browser, may send a first HTTP request to a jumping server, e.g., "v.cctv.com/s.mp4".

2. The jumping server may receive the first HTTP request, and may specify a content server, based on principles such as a closest service distance principle. For example, the IP address of the specified content server may be "1.1.1.1".

3. The jumping server may convert the IP address of the content server to the prefix of the jumping domain name, according to predetermined rules, e.g., a Base32 algorithm. For example, the Base32 algorithm may be used to convert "1.1.1.1" to a prefix "GEXDCLRRFYYQ" (replaced by "1-1-1-1" in the follows). It should be noted that, according to the Base32 algorithm, the actual string obtained may be "GEXDCLRRFYYQ═══════". However, because "=" is not allowed in domain names, "=" needs to be removed. Further, it should be noted that, in the prefix, besides the string converted from the IP address of the content server, the prefix may also include other contents. For example, the prefix may include the content converted from a domain name contained in the first HTTP request, based on the predetermined rules, i.e., "v-cctv-com" converted from "v.cctv.com" (as an example). The corresponding prefix may be "1-1-1-1-cctv-com". Further, a pre-registered service domain name may be used as the suffix of the jumping domain name. For example, the pre-registered service domain name may be "ourdvss.com". Thus, the obtained jumping domain name may be "1-1-1-1.ourdvss.com" or "1-1-1-1-v-cctv-com.ourdvss.com".

4. The jumping server may combine the jumping domain name and the URL contained in the first HTTP request to form a jumping URL. For example, "1-1-1-1.ourdvss.com" and "v.cctv.com/s.mp4" may be combined to form "1-1-1-1.ourdvss.com/v.cctv.com./s.mp4".

5. The jumping server may send the jumping URL to the client terminal. For example, the jumping server may send "1-1-1-1.ourdvss.com/v.cctv.com/s.mp4" to the client terminal.

6. The client terminal may receive the jumping URL, and send the jumping domain name contained in the jumping URL to a DNS server. For example, the client terminal may send a resolution request for "1-1-1-1.ourdvss.com" to the DNS server.

7. The DNS server may receive the domain-name resolution request. When the DNS server recognizes the pre-registered domain name in the domain-name resolution request, the DNS server may convert the prefix of the jumping domain name according to an inverse algorithm of the predetermined rules, to obtain the IP address of the content server. For example, the DNS server may detect "ourdvss.com", and may invert "1-1-1-1" to "1.1.1.1" according to the inverse algorithm of Base32. It should be noted that, before converting the prefix of the jumping domain name, the DNS server may complete the symbols that have been removed according to predetermined rules. For example, for the string "GEXDCLRRFYYQ" represented by "1-1-1-1", the DNS server may, according to Base32 algorithm, complete the string to be "GEXDCLRRFYYQ═══════". Further, based on the inverse algorithm of Base32, the DNS server may convert the "GEXDCLRRFYYQ═══════". In addition, it should be noted that, when the prefix includes other contents, the DNS server may also restore the contents based on the inverse algorithm of the predetermined rules. For example, the prefix may further include the content converted from a domain name contained in the first HTTP request, based on the predetermined rules. Accordingly, when detecting the pre-registered domain name, the DNS server may restore the domain name in the first HTTP request for subsequent uses such as counting and other purposes. For example, "v-cctv-com" may be restored to "v.cctv.com".

8. The DNS server may send the restored IP address of the content server to the client terminal. For example, the DNS server may send "1.1.1.1" as an A-record to the client terminal.

9. The client terminal may receive the IP address of the content server, and may send a second HTTP request to the content server, where the second HTTP request includes the jumping URL. For example, the client terminal may send the second HTTP request, containing "1-1-1-1.ourdvss.com/v.cctv.com/s.mp.4", to the content server.

10. The content server may receive the second HTTP request, and may send the corresponding HTTP response to the client terminal, the HTTP response containing the content desired by the client terminal such as video files, etc. It should be noted that, the content server may be bound with a service specific suffix, that is, the SSL certificate of a pre-registered service domain name, to provide response service for the client terminal.

Figure 2:
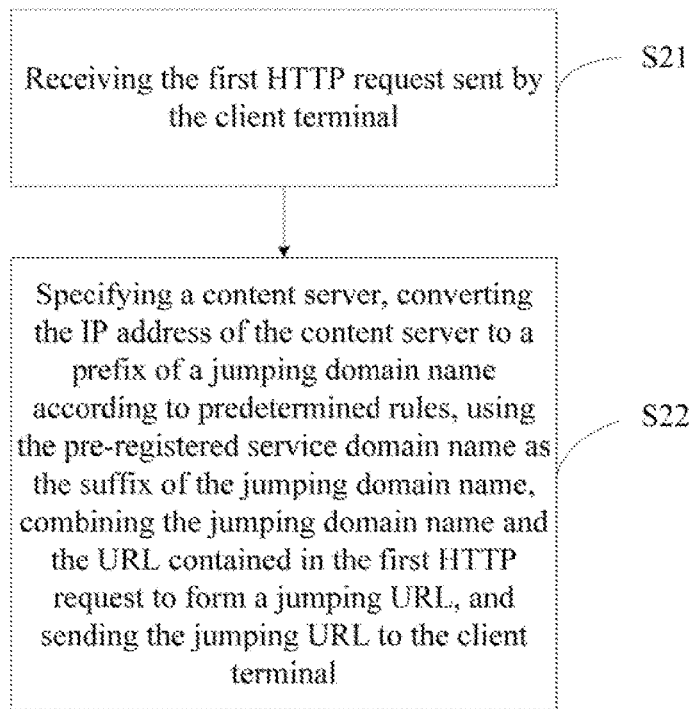
FIG. 2 illustrates an exemplary method to generate a jumping URL consistent with the disclosed embodiments of the present disclosure.

As shown in FIG. 2, similar to the aforementioned working principles of the 302 jumping method that supports HTTPS, the present disclosure provides a method for generating a jumping URL. The method may be applied on the jumping server connected with the client terminal, through communication link. Preferably, the method may be applied on the jumping server in the network system shown in FIG. 1. The method comprises the following steps:

In step S21, the first HTTP request sent from the client terminal may be received.

In step S22, a content server may be specified. The IP address of the content server may be converted to a prefix of a jumping domain name according to predetermined rules (e.g., Base32 algorithm), the pre-registered service domain name may be used as the suffix of the jumping domain name, the jumping domain name and the URL contained in the first HTTP request may be combined to form a jumping URL, and the jumping URL may be sent to the client terminal.

Figure 3:
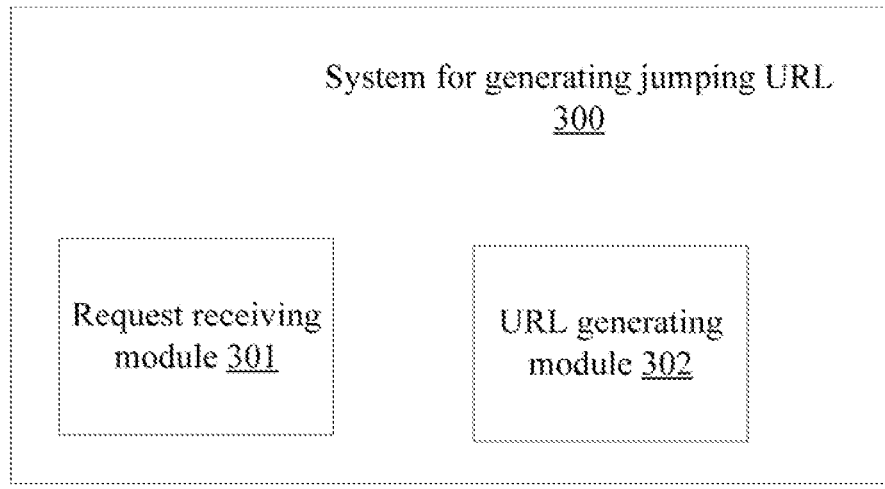
FIG. 3 illustrates an exemplary system to generate a jumping URL consistent with the disclosed embodiments of the present disclosure.

As shown in FIG. 3, similar to the working principles illustrated in FIG. 2, the present disclosure further provides a system 300 for generating a jumping URL, applied on a jumping server. The disclosed system may include a request receiving module 301 and a URL generating module 302.

The request receiving module 301 may receive a first HTTP request sent from the client terminal. The URL generating module 302 may specify a content server, convert the IP address of the content server to a prefix of a jumping domain name according to predetermined rules, use the pre-registered service domain name as the suffix of the jumping domain name, combine the jumping domain name and the URL in the first HTTP request to form a jumping URL, and send the jumping URL to the client terminal. In one embodiment, the URL generating module 302 may convert the domain names in the first HTTP request according to predetermined rules and add the converted first HTTP request into the prefix.

Figure 4:
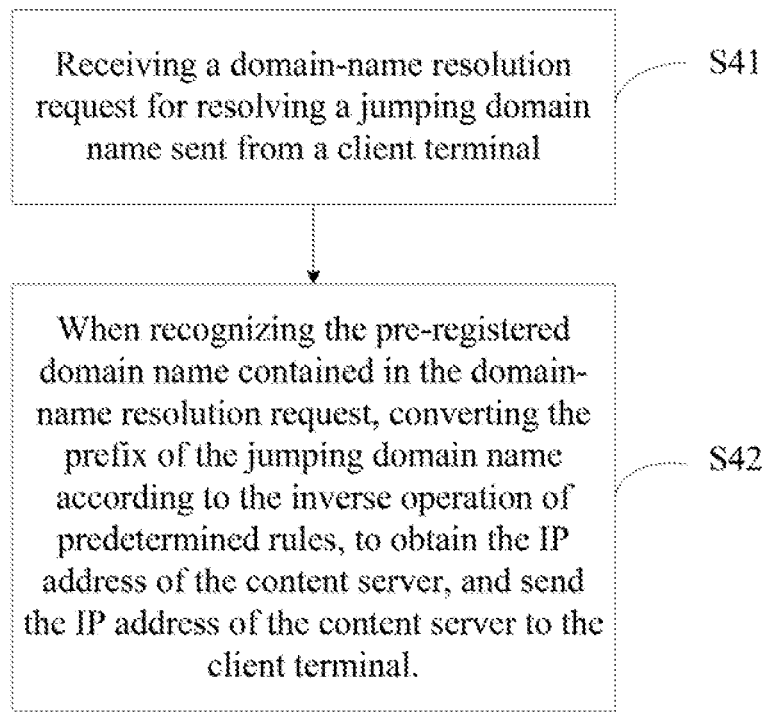
FIG. 4 illustrates an exemplary resolving method for a jumping-domain-name resolution request consistent with the disclosed embodiments of the present disclosure.

As shown in FIG. 4, similar to the working principles of the aforementioned 302 jumping method that supports HTTPS, the present disclosure provides a resolving method for a jumping-domain-name resolution request, applied on the DNS server connected with the client terminal, through communication link. Preferably, the disclosed resolving method may be applied on the DNS server in the network system shown in FIG. 1. The disclosed resolving method may include the follows.

In step S41, a domain-name resolution request for resolving a jumping domain name, sent from a client terminal, may be received.

In step S42, when the pre-registered domain name contained in the domain-name resolution request is recognized, the prefix of the jumping domain name may be converted according to the inverse operation (e.g., inverse Base32 algorithm) of predetermined rules (e.g., Base32 algorithm), to obtain the IP address of the content server and send the IP address of the content server to the client terminal. In one embodiment, step S42 may further include restoring the prefix to obtain the corresponding domain name and storing the domain name.

Figure 5:
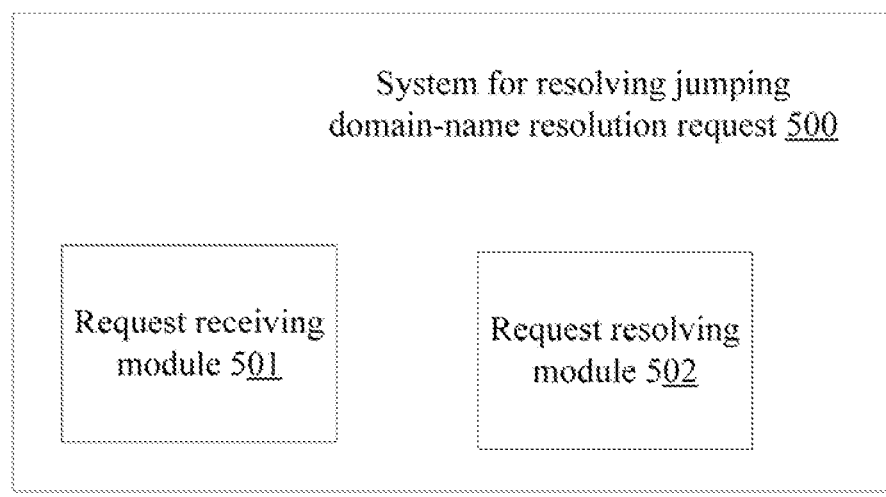
FIG. 5 illustrates an exemplary system for resolving a jumping-domain-name resolution request consistent with the disclosed embodiments of the present disclosure.

As shown in FIG. 5, similar to the working principles illustrated in FIG. 4, the present disclosure further provides a system 500 for resolving a jumping-domain-name resolution request, applied on the DNS server. The disclosed system 500 may include a request receiving module 501 and a request resolving module 502.

The request receiving module 501 may receive a domain-name resolution request for resolving a jumping domain name sent from a client terminal. When the request resolving module 502 recognizes the pre-registered domain name in the domain-name resolution request, the request resolving module 502 may convert the prefix of the jumping domain name according to the inverse operation of predetermined rules, to obtain the IP address of the content server and send the IP address of the content server to the client terminal.

The present disclosure provides a network system, including a content server, a jumping server comprising system 300, and a DNS server comprising system 500. The three types of servers may be respectively connected with the client terminal through communication link. The aforementioned technical features of the servers may be applied on the present embodiment, so that the technical features of the disclosed network system are not repeated herein.

Thus, the disclosed 302 jumping method, the URL generating method and system, and the domain-name resolving method and system, may solve the problem of not being able to directly use the 302 jumping technique in an existing CDN system when the entire website uses HTTPS. Scalability may be effectively improved. The shortcomings in the conventional technology may be effectively overcome and the disclosed methods and systems have high industrial value.

The aforementioned embodiments merely illustrate the principles and effects of the present disclosure and are not intended to limit the disclosure. Any person skilled in the art will be able to modify or alter the aforementioned embodiments without departing from the spirit and scope of the disclosure. Accordingly, all equivalents or modifications that may be made by those skilled in the art without departing from the spirit and technical concept disclosed in the present disclosure are intended to be encompassed by the claims of the present disclosure.

What is claimed is:

1. A method for resolving a domain-name resolution request in a network system, comprising:
   sending, by a client terminal, a first HTTP (hypertext transfer protocol) request to a jumping server for a requested content;
   receiving, by the jumping server, the first HTTP request sent from the client terminal; and
   specifying, by the jumping server, a content server, and converting, by the jumping server, an IP (Internet protocol) address of the content server to a prefix of a jumping domain name according to predetermined rules, wherein the prefix of the jumping domain name further includes content converted from a domain name in the first HTTP request according to the predetermined rules.

2. The method according to claim 1, further comprising:
   using, by the jumping server, a pre-registered domain name as a suffix of the jumping domain name;
   combining, by the jumping server, the jumping domain name and a URL in the first HTTP request to form a jumping URL (uniform resource locator); and
   sending, by the jumping server, the jumping URL to the client terminal.

3. The method according to claim 2, further comprising:
   receiving, by the client terminal, the jumping URL, and sending, a domain-name resolution request to resolve the jumping domain name, contained in the jumping URL, to a DNS (domain name system) server;
   receiving, by the DNS server, the domain-name resolution request; and
   in response to recognizing the pre-registered domain name in the domain-name resolution request, converting, by the DNS server, the prefix of the jumping domain name based on an inverse operation of the predetermined rules to obtain an IP address of the content server, and sending, by the DNS server, the IP address of the content server to the client terminal.

4. The method according to claim 3, further comprising:
   receiving, by the client terminal, the IP address of the content server; and
   sending, by the client terminal, a second HTTP request to the content server, the second HTTP request containing the jumping URL.

5. The method according to claim 4, further comprising:
   receiving, by the content server, the second HTTP request; and
   sending, by the content server, a response to the second HTTP request to the client terminal, the response to the second HTTP request containing the requested content.

6. The method according to claim 1, wherein the predetermined rules include a Base32 algorithm.

7. The method according to claim 1, wherein converting the prefix of the jumping domain name based on an inverse operation of the predetermined rules further includes obtaining a domain name in the first HTTP request.

8. A 302 jumping method that supports hypertext transfer protocol secure (HTTPS), comprising:
   sending, by a client terminal, a first HTTP request to the jumping server;
   receiving, by a jumping server, the first HTTP request; specifying, by the jumping server, a content server, to convert an IP address of the content server to a prefix of a jumping domain name according to predetermined rules; using, by the jumping server, a pre-registered domain name as a suffix of the jumping domain name; combining, by the jumping server, the jumping domain name and a URL (uniform resource locator) in the first HTTP request to form the jumping URL; and sending, by the jumping server, the jumping URL to the client terminal;
   receiving, by the client terminal, the jumping URL, and sending, by the client terminal, a domain-name resolution request for resolving the jumping domain name in the first HTTP request to the DNS server;
   receiving, by the DNS server, the domain-name resolution request; in response to recognizing the pre-registered domain name in the domain-name resolution request, inverse converting, by the DNS server, the prefix of the jumping domain name based on the predetermined rules to obtain an IP address of the content server; and sending, by the DNS server, the IP address of the content server to the client terminal;

receiving, by the client terminal, the IP address of the content server, and sending, by the client terminal, a second HTTP request containing the jumping URL, to the client terminal; and receiving, by the content server, the second HTTP request, and sending by the content server, an HTTP response, generated accordingly, to the client terminal.

9. A network system, comprising:

a request receiving module, for receiving first HTTP request sent from a client terminal; and a URL (uniform resource locator) generating module, for specifying a content server, and converting an IP (Internet protocol) address of the content server to a prefix of a jumping domain name according to predetermined rules, wherein the prefix of the jumping domain name further includes content converted from a domain name in the first HTTP request according to the predetermined rules.

10. The network system according to claim 9, wherein the URL generating module further:

uses a pre-registered domain name as a suffix of the jumping domain name;

combines the jumping domain name and a URL in the first HTTP request to form a jumping URL; and sends the jumping URL to the client terminal.

11. The network system according to claim 10, further comprising:

a request receiving module, by the DNS server, for receiving a domain-name resolution request for resolving the jumping domain name sent from the client terminal; and a request resolving module, in response to recognizing the pre-registered domain name in the domain-name resolution request, converting the prefix of the jumping domain name based on an inverse operation of the predetermined rules to obtain an IP address of the content server, and sending the IP address of the content server to the client terminal.

12. The network system according to claim 9, wherein the predetermined rules include a Base32 algorithm.

13. The network system according to claim 9, wherein converting the prefix of the jumping domain name based on an inverse operation of the predetermined rules further includes obtaining a domain name in the first HTTP request.

* * * * *